Dec. 19, 1967 J. DENIS ET AL 3,359,400
WELDING MACHINE
Filed March 18, 1965 5 Sheets-Sheet 4

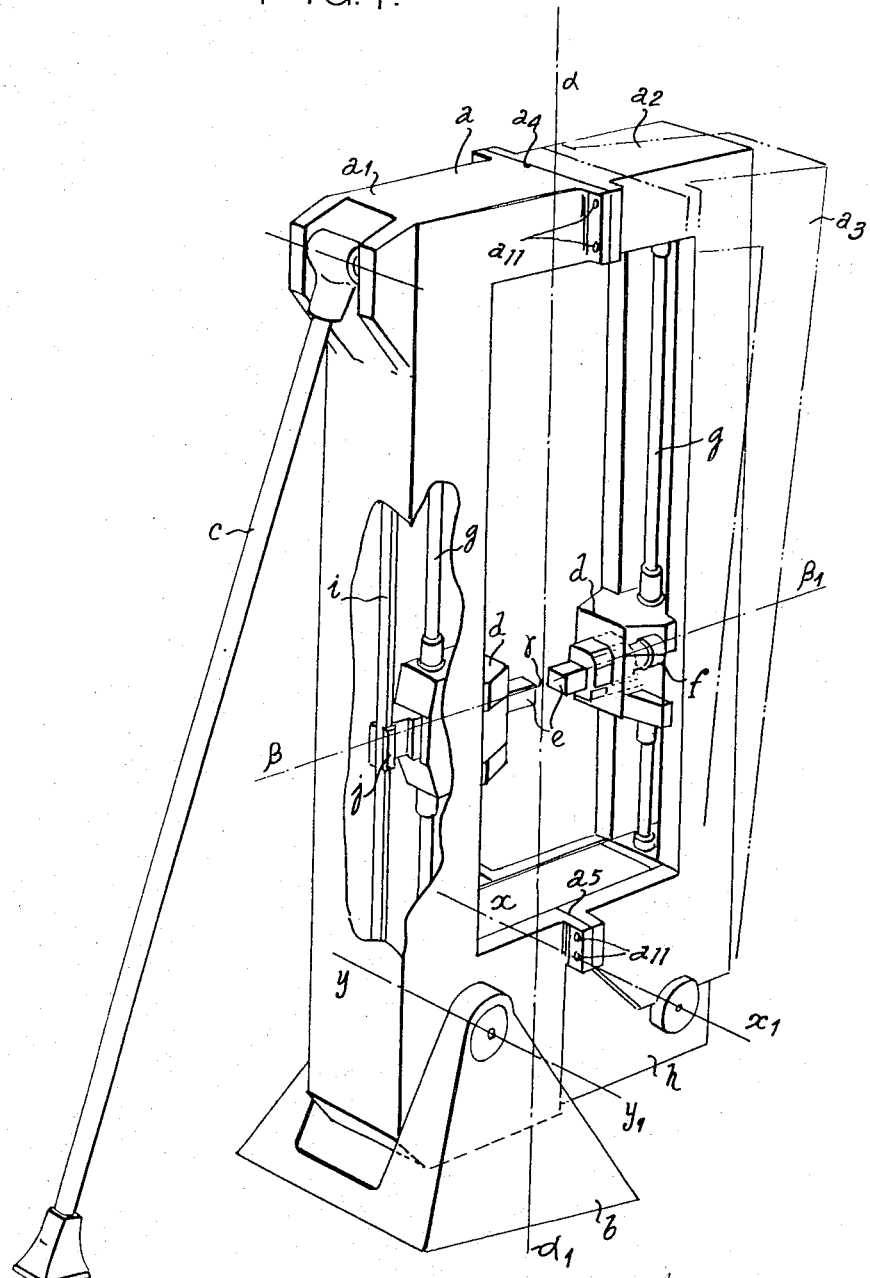

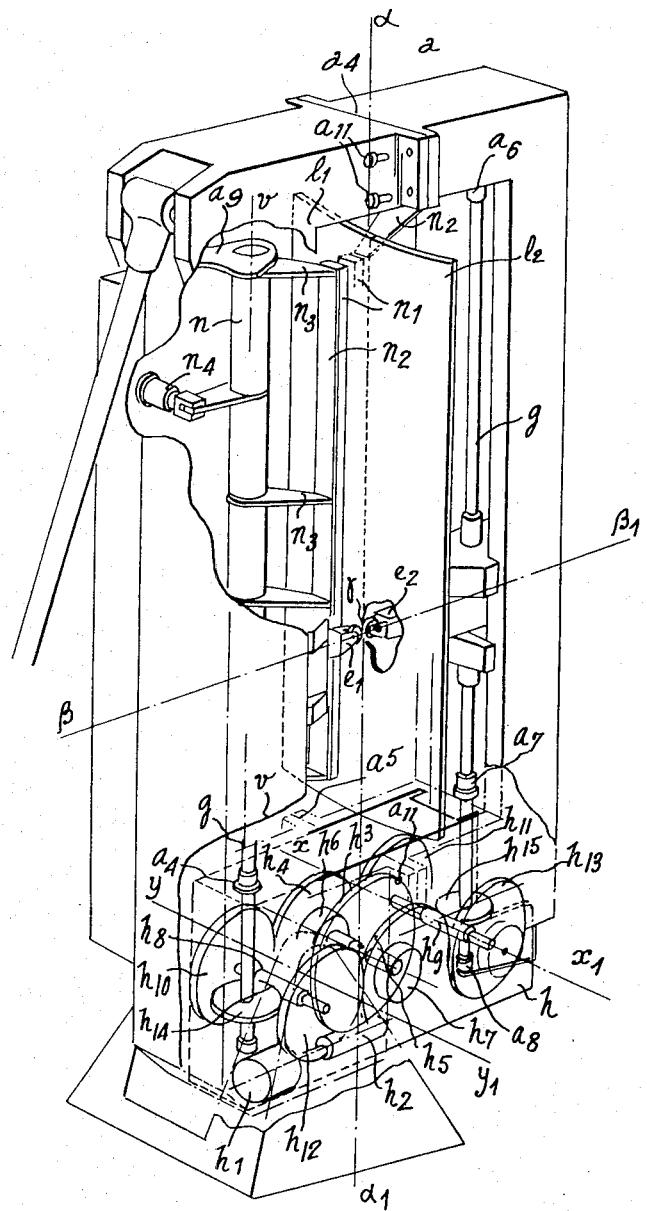

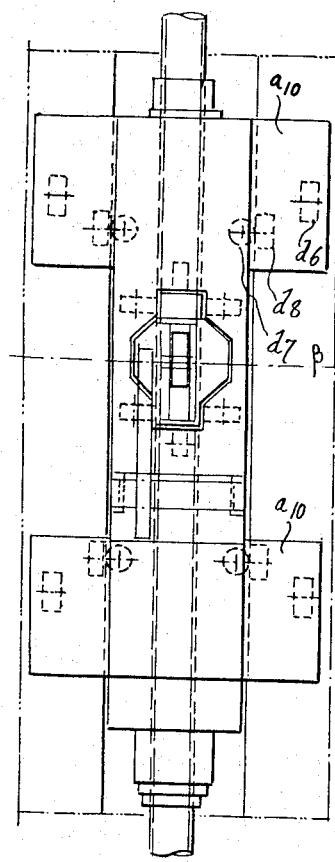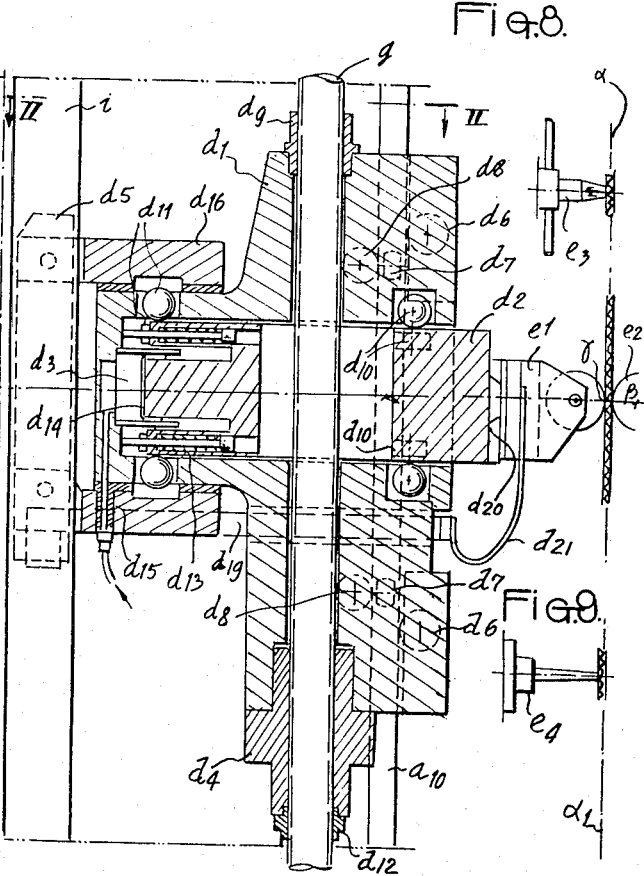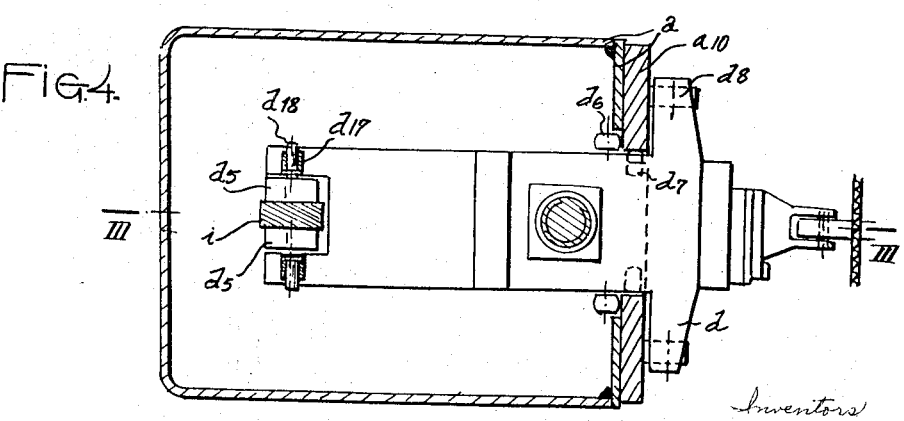

United States Patent Office 3,359,400
Patented Dec. 19, 1967

3,359,400
WELDING MACHINE
Jean Denis, Antony, and Gaston Albert Fontaine and Charles Molin, Chatenay-Malabry, France, assignors to Nord-Aviation Societe Nationale de Constructions Aeronautiques, Paris, France, a joint-stock company of France
Filed Mar. 18, 1965, Ser. No. 440,828
Claims priority, application France, Mar. 25, 1964, 968,726
8 Claims. (Cl. 219—78)

ABSTRACT OF THE DISCLOSURE

A welding machine with a rectangular, elongated frame constituted by two half-frames in the form of a U, pivotally mounted, with lead screw means parallel to each of the frame sides to move trolleys which carry the welding equipment.

---

The present invention relates to a welding machine, intended more particularly for the construction of simple or complex units in aerospace equipments which may be of very large size and in which the thickness of the metal sheets employed may be very small, of the order of 0.1 mm.

The invention also includes, by way of new products, the products obtained with this machine.

Forming or welding machines existing at the present time only permit the construction of units of small or medium dimensions. The welding machine according to the present invention has essentially for its object the production of these units of large size.

The welding machine according to the invention is of the type with two opposite trolleys carrying the welding equipments and being moved simultaneously so as to execute straight welding lines by applying variable opposite pressures, their axes being in line with each other, and it is essentially characterized in that it comprises an elongated rectangular frame constituted by two half-frames in the form of a U, the bar of the U of each of the half-frames forming one of the large size of the frame, and their two arms forming the small sides when they are coupled to each other; a pivotal shaft supported by a base fixed to the ground, about which the frame is arranged to pivot, and means for locking one of its half-sides in any desired position between the vertical position and the position close to the horizontal; an opening shaft for the frame, supported by the two arms which constitute one of the small sides of the frame, parallel to the pivotal shaft, about which the free half-frame can pivot with respect to the locked half-frame; two lead-screws respectively parallel to each of the large sides of the frame, driving the trolleys which carry the welding equipments along guiding elements, and rotating under the action of a variable-speed driving device; supporting devices for holding the parts of the assembly to be welded in position with respect to the frame; mounting devices for holding all the parts of the assembly in position, one with respect to the others, during the passage of the said assembly from one position corresponding to an effective welding operation to the adjacent position corresponding to the following effective welding operation, and an electric and pneumatic equipment for actuating the lead-screws, the supporting and mounting devices of the assembly in synchronism, together with the operations of the two trolleys on their common shaft, the two trolleys carrying the guiding equipments thus moving parallel to the large sides of the frame under the action of their respective lead-screws, and symmetrically to each other with respect to a fixed line of working, defined by the intersection of the common axis of the guiding equipments and the plane perpendicular to the frame passing through the centre of its small sides.

The present welding machine can in particular be provided with a mounting intended to support the assembly to be welded and to bring all its parts into the welding position successively.

The driving device for the lead-screws is preferably constituted by a kinematic chain, in which the lead-screw moved during the opening and closure of the frame returns to its initial position without special precautions.

The trolleys may be provided with equipment for resistance spot welding, T.I.G. (welding in an inert atmosphere), etc.

The dimensions of the assemblies to be welded may be very large by virtue of the dimensions of the frame and these assemblies can be closed by virtue of the possibility of opening the frame.

These assemblies are carried by a mounting.

An electrical and pneumatic equipment permits the supply of current to the welding equipments and the supply of compressed air for the various jacks to be effected automatically when the mounting is stopped, to effect the rotation of a motor to move the said mounting between two successive welding positions, an interlock automatically preventing the upward or downward movement of the trolleys while the motor is rotating and the operation of this latter during the upward and downward movement of the trolleys.

The invention will be more clearly understood from the description given below of one form of preferred construction of the welding machine, reference being made to the accompanying diagrammatic drawings, in which:

FIG. 1 is a view in perspective of the welding machine with parts broken away to show one of the feed rods and one of the lead-screws.

FIG. 2 is a view in perspective in which there can be seen the driving device for the lead-screws and the supporting device for the parts of the assembly to be welded, with respect to the frame.

FIGS. 3 and 4 are respectively a cross-section of one of the trolleys carrying a welding equipment, taken along the plane III—III of FIG. 4 and the plane IV—IV of FIG. 3.

FIG. 5 is a side view of the trolley of FIG. 3 looking from the right.

FG. 6 shows a method of assembling together two composite panels utilized in a unit intended to be welded.

Figure 6:
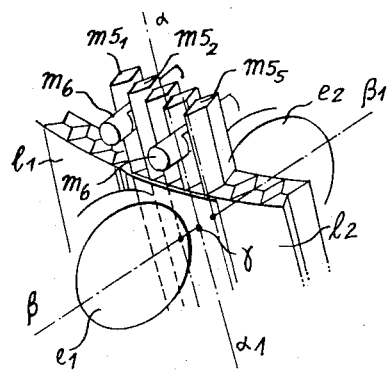
Figure 7:
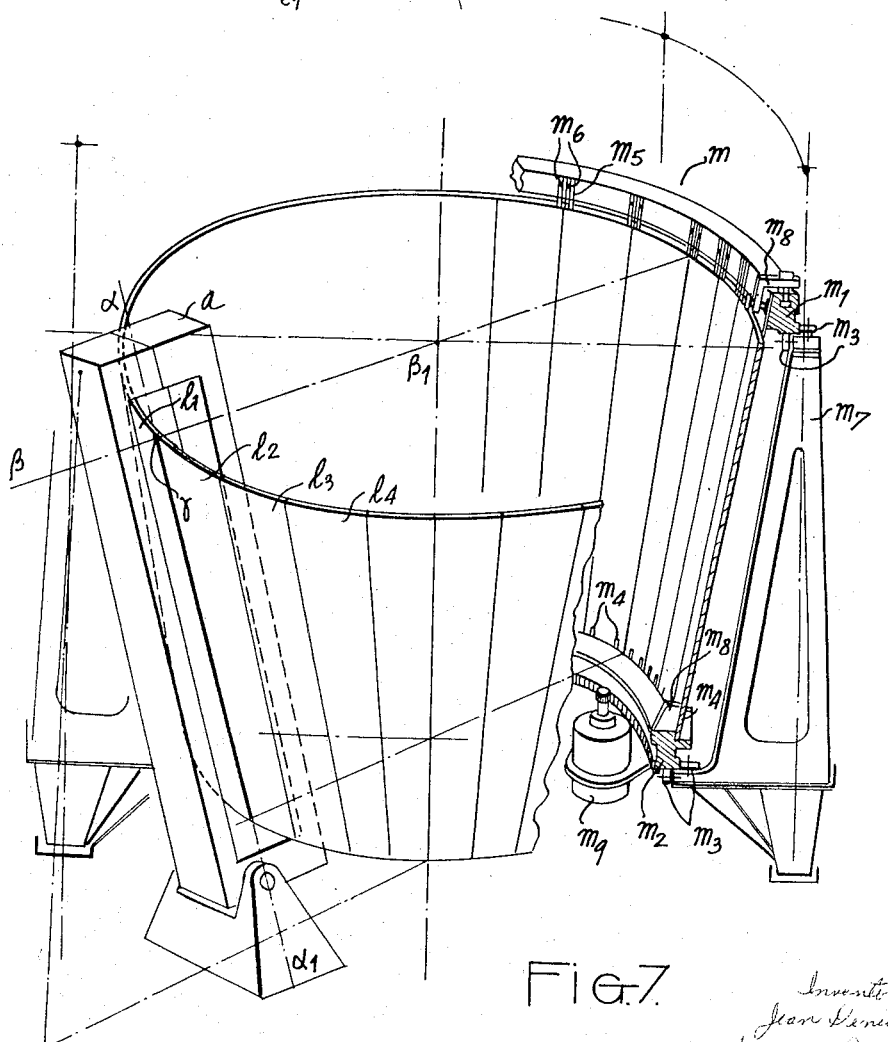

FIG. 7 represents the mounting employed to support a formed unit in which the panels are assembled to each other in accordance with the method of FIG. 6.

FIG. 8 and 9 show other welding equipments which can be fitted on the trolleys so as to carry out weldings of different types.

Figure 10:
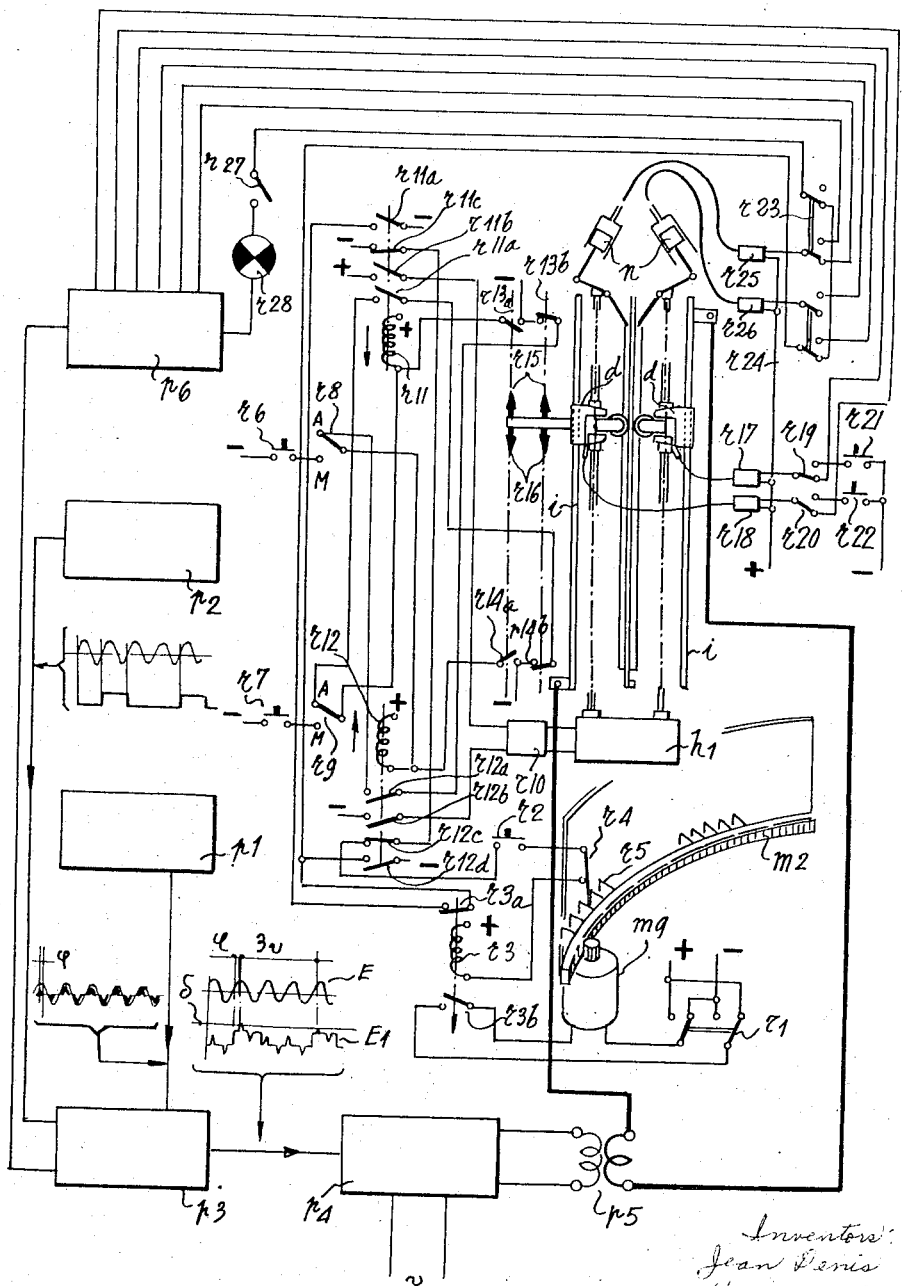

FIG. 10 shows the whole of the electric and electronic circuits for "welding" and "sequences."

In FIG. 1, the welding machine is composed of a rectangular frame $a$ of elongated form articulated about an axis $y_1$, known as the frame pivotal shaft supported by a base $b$ fixed to the ground.

The frame $a$ is constituted by two half-frames $a_1$, $a_2$, each having the form of a U, the bar of which constitutes one of the large sides of the frame $a$ and the arms forming the small sides when they are coupled together. The two half-frames $a_1$ and $a_2$ are articulated to each other about an axis $x$–$x_1$ known as the frame-opening axis, parallel to the pivotal axis $y$–$y_1$, the frame $a_2$ coming into a position such as that shown in chain-dotted lines at $a_3$. They may be locked to each other by clamping the joints $a_4$, $a_5$.

A bracing strut $c$ is pivoted at one of its extremities on the extremity of the half-frame $a_1$ farthest away from the pivotal axis $y-y1$ and fixed to the ground by its other extremity at a variable point. This bracing strut enables the half-frame $a1$ and therefore the frame $a$ when it is closed, to be fixed in any position between the vertical and a substantially horizontal position.

Two identical trolleys $d$ carrying welding equipments $e$, are arranged facing each other parallel to the small sides of the frame $a$ and are adapted to move simultaneously each along a lead-screw $g$, parallel to the large sides of the frame $a$.

The welding equipments $e$ are each actuated by a jack $f$, so as to be able to move parallel to the small sides of the frame $a$, this last movement being effected by pneumatic means.

The common axis of the trolleys $d$ cuts the plane perpendicular to the frame $a$, passing through the centre of its small sides at a point $\gamma$ known as the "working point." When the trolleys $d$ are moved by means of their lead-screws $g$, this working point $\gamma$ is moved along a working line $\alpha-\alpha1$. This working line may represent either the line of welding actually effected or, and this is more generally the case, the central line between the two lines of welding effectively obtained when the assembly is formed by composite elements and has a certain thickness.

A motor-driven variable-speed reduction unit $h$ is mounted at the lower part of the frame $a$, inside its small side (see FIG. 2). A variable-speed motor $h1$ drives a toothed wheel $h3$ through the intermediary of an endless screw $h2$. This toothed wheel is carried by a shaft which receives two other wheels $h4$ and $h5$ of different diameters. Two magnetic couplings $h6$ and $h7$, placed between these wheels $h4$ and $h5$ fix the wheel $h3$ to one or the other of these wheels. The wheel thus selected transmits the movement to the endless screw $h8$ or $h9$ through the intermediatry of the wheels $h10$, $h11$ or $h12$, $h13$. These endless screws actuate in turn the wheels $h14$ and $h15$, keyed on the lead-screw $g$. The selection obtained by the magnetic coupling $h6$ and $h7$ has thus the effect of choosing one of the two speeds of rotation of the lead screws which determine the speed of movement of the trolleys $d$, and in consequence the speed of working, welding or rapid movement. The lead-screws $g$ are supported by bearings $a6$, $a7$, $a8$ which are fixed to the frame $a$.

A mechanical arrangement permits the opening of the half-frame $a2$, without mechanical interruption of the coupling of the lead-screws, due to the fact that the axis of opening $x-x1$ is coincident with the axis of the endless screw $h9$. The toothed wheel $h15$, fixed to the half-frame $a2$ can in fact rotate concentrically round this screw without being separated from it. The closure of the frame $a$ is ensured by bolts $a11$ which clamp together the flat face of the joints $a4$, $a5$.

The trolley $d$, shown in FIGS. 3, 4 and 5 is provided by way of example with a seam-welding equipment $e1$. This trolley comprises essentially a body $d1$, an equipment carrier $d2$, a pneumatic jack $d3$ (shown at $f$ in FIG. 1), a ball nut $d4$, electric wiper contacts $d5$. Rollers $d6$, $d7$ and $d8$ guide the trolley along the uprights $a10$ rigidly fixed to the frame $a$. Rollers $d10$ and $d11$, supported by the body $d1$ and arranged on each side of the lead-screw, guide the equipment carrier $d2$ in its transverse movement with respect to the said body $d1$.

The body $d1$ is traversed by the lead-screw $g$ and receives at its lower portion a ball nut $d4$ protected by a joint $d12$, a further joint $d9$ being provided at its upper part. It is also provided at its centre with an equipment-carrier $d2$, bored-out for the passage of the lead-screw $g$. This equipment carrier, guided in its lateral movement by the rollers $d10$ and $d11$ moves on the one hand by the action of springs $d13$ which urge it towards the left and, on the other hand by the action of a pneumatic jack $d3$ which moves it towards the right. The jack $d3$ is constituted by a chamber made fluid-tight by an enclosing diaphragm $d14$. A conduit $d15$ brings the compressed-air into this chamber. In the absence of air pressure, it is clear that the equipment carrier $e1$ is moved towards the left, which corresponds to its disengaged position.

The electric sliding contacts which bring the welding current to the equipments $e1$ and $e2$ are constituted by two conductor units engaging the bar $i$. These units are kept under pressure against the bars $i$ by a floating mounting constituted by springs $d17$ mounted on positioning screws $d18$. These sliding contacts $d5$ are mounted on an insulated support $d16$. Conductors $d19$, ending in flexible shunts $d21$ terminate at the equipment $e1$.

FIG. 5 shows the guiding of the trolley on the uprights $a10$ of the frame $a$. The rollers $d6$ and $d8$ guide it longitudinally and the rollers $d7$ laterally.

By way of example and without limitation, FIGS. 8 and 9 show respectively a T.I.G. welding equipment $e3$ and a spot resistance welding equipment $e4$ which can be mounted on the equipment carrier $e1$. A dove-tail assembly $d20$ (see FIG. 3) permits these various equipments to be fixed and removed rapidly.

It is clear that during their lateral movement on the uprights $a10$, the trolleys $d$ apply cycles of pressure by means of the jacks $d3$ to the welding equipments, and these cycles are adapted as a function of the method of welding chosen so that these cycles may be very rapid by virtue of the high sensitivity of the jacks and finally that the large disengagement clearance of the equipments permits the passage over obstacles which may be located on the trajectory of a line of welding.

The welding machine according to the invention may receive various devices for keeping the elements to be welded in position, on the one hand with respect to the frame $a$ during the actual welding operations, and on the other hand with respect to each other.

If it is required to weld together the two corrugated-core panels 11 and 12 shown in FIG. 2, the mounting can be employed to hold them in position with respect to the frame $a$. This mounting arrangement comprises elementary devices $n$ such as that which is shown in FIG. 2. The sheet 11 is fixed between two strips of rubber $n1$, each applied against a rigid plate $n2$. This rigid strip is mounted with a certain degree of freedom on the extremity of the arms $n3$ which are in turn pivoted about the axis $v-v1$ parallel to the large sides of the frame $a1$, this axis $v-v1$ being fixed to the frame $a1$ by levers $a9$ carrying bearings in which the device $n$ pivots under the action of a jack $n4$ fixed on the frame $a1$.

The second strip of rubber $n1$ belongs to a second device $n$ exactly similar to that above but in which the fixed elements are secured to the half-frame $a2$.

It is clear that these two conjoint devices only hold one sheet 11, and that other sets of two similar conjoint devices must be provided for holding the other sheets, or part of them only, as the case may be.

If it is required to weld a closed assembly, a special mounting is employed which is particularly provided for welding to each other a certain number of panels with corrugated cores, intended for example to form the interstage connections of frusto-conical shape, of a rocket. The length of these panels may be of the order of 2 meters and the diameters of the bases of the cone frustum to be obtained may be of the order of 3 meters for the large base and 2 meters for the small base. The prefabricated elementary panels, comprising a corrugated core obtained by welding to each other two corrugated sheets of similar kinds, along lines which contain their corrugation crests. This corrugated core is covered on each side with a smooth metal sheet, the thickness of each of these sheets being of the order of 0.1 mm. The method of welding employed is electric seam welding with pressure wheels.

The welding of these panels necessitates their prior assembly. This assembly is obtained by arranging the facing edges in a special manner, one of the edges terminating in an open half-wave with the two covering sheets projecting, the other edge terminating in an incompletely-closed half-wave which is not covered, like the two waves which precede it, by covering sheets, this latter edge constituting a male element which fits into the other edge forming a female element (see FIG. 6). An assembly of this kind is described in the application of Charles Molin and Marius Pinchemel, Ser. No. 436,616, filed Mar. 2, 1965, entitled "Method of Joining Together Corrugated-Core Panels."

The panels 11, 12, 13 . . . are placed, as and when they are assembled together, on a mounting $m$, see FIG. 7, essentially constituted by two horizontal rings $m1$ and $m2$, each resting on rollers $m3$ rigidly fixed to six supports $m7$, in the present example.

Mandrels $m5$ are introduced into the corrugations adjacent the lines of welding to be carried out, so as to prevent them from being crushed during the course of welding. The panels 11, 12, 13 . . . , including their mandrels $m5$ are fixed on the lower ring $m2$ by pegs $m4$, two per panel for example, rigidly fixed to this ring, on which the corrugations of the panel are introduced. On the other hand, these panels abut against the upper ring $m2$ through the intermediary of the mandrels $m5$ which extend beyond the panels and are held in position with respect to each other by nipples $m6$ intercalated between them. Clamping tools $m8$ fix the panels with respect to the upper ring $m3$.

A motor $m9$ carried by one of the supports $m7$ for example, directly drives the lower ring $m2$ which has internal teeth, and thus rotates the whole unit to be welded so that the working line $\alpha-\alpha1$ of the welding machine is successively located at equal distances between the two pressure wheels $e1$, $e2$, or in other words between the groups of two lines of welding to be effected.

The foregoing description of the welding machine has brought out a certain number of characteristic features, in particular the following:

Inclination of the frame $a$ at any desired angle;
Opening of this frame $a$;
Holding in position of the elements to be welded to each other;
The possibility of adapting to this frame various mountings permitting the welding of elements previously assembled together, these elements constituting a closed unit, the dimensions of which do not vary during welding;
The possibility of handling elements of a certain thickness, it being possible to obtain at the same time two lines of welding symmetrical to each other with respect to the working line;
The possibility not only of welding together panels with corrugated cores, but also of producing the panels themselves;
The elements to be assembled together or to be produced, may be flat or curved, but the lines of welding obtained are always straight;
The welding does not modify the dimensions of the unit assembled in position on its mounting $m$.

All these characteristics are utilized by virtue of the electric equipment shown in the diagram of FIG. 10. The following description brings out particularly the production of the electric welding cycles and the automatic sequence of all the operations on a given unit, and gives a certain number of indications with respect to alternative methods of operation and of use.

The electric welding apparatus comprises a de-phasing generator of synchronized impulses $p1$, a square-top wave generator $p2$, a mixing unit $p3$, a control unit $p4$, and a welding transformer $p5$, the output of which is connected to the supply bars $i$, all these components being individually of conventional type.

The co-ordination of the welding cycles and of the automatic sequence of the operations is effected by a coupling unit $p6$.

In FIG. 10, which corresponds to the welding of the closed unit shown in FIGS. 6 and 7, the sequence of the welding cycles, for reasons of simplification of the description, is of the type: welding—one period; rest—two periods. More generally, it is of the type: welding—three periods; rest—fifteen periods.

The operation of this chain is as follows: the welding current is produced by the transformer $p5$ when the thyratrons (not shown for the purpose of simplicity, the circuit employed being in fact conventional) of the control unit $p4$ permit the passage of this current. This passage is only allowed when the grid voltage of these thyratrons has reached a critical value $\delta$.

It is in fact known that a thyratron operates in the following manner:

When an anode voltage is applied to the thyratron and while the grid voltage is too negative, the thyratron is non-conducting. When this grid voltage reaches the value $\delta$, it becomes conducting and remains so, irrespective of the value of the grid voltage, as long as its anode voltage is maintained. In the present case, if the alternating voltage E of the supply system is applied to the anode, the thyratron will be conducting when the grid voltage E1 has reached the value $\delta$ and it will so remain up to the instant when the alternating voltage E passes again through zero, when the anode will then have a zero voltage. By an appropriate connection of two thyratrons, it is possible to make them each conducting for each half period, or in other words to obtain operation by period or by half-period.

The de-phasing $\phi$ has the function of displacing, with respect to the origin of the wave, the impulse which gives the grids of the thyratrons the potential level $\delta$. In consequence, it defines the value of the effective welding current by the relative time of operation of the thyratrons which it controls.

It can be said that the generator $p1$ supplies synchronous peaks with a variable de-phasing $\phi$, and that these peaks are superimposed on square top waves of variable duration produced by the square-top wave-generator $p2$.

The mixer unit $p3$ applies these impulses to a control unit $p4$ which in its turn modulates the primary circuit of the transformer $p5$, the secondary of this transformer transmitting the modulation to the welding equipments.

The welding transformer $p4$ is located in such manner, and the connection to the bars $i$ is made in such a way that the self-induction remains constant during the movement of the welding equipments along the uprights $a10$.

The successive operations begin by the suitable placing of a line of work between the pressure wheels of the trolleys $d$. In order to do this, the motor $m9$, rotating in the direction selected by a switch $r1$, is set into motion by a push button $r2$ and a relay $r3$ until a position switch $r4$ opens the circuit by stops $r5$. These stops have a pre-determined distance apart corresponding to the relative positions of the lines of work.

After this positioning, the trolleys $d$ are brought at the beginning of their travel by means of push-rods $r6$ or $r7$ and change-over switches $r8$ or $r9$ placed in the manual position (M). The later are then put into the automatic position (A) and the welding operation can then begin.

The speed of movement has been previously selected by the clutches $h6$ or $h7$ and the selector $r10$ acting on the variable speed motor $h1$. After this placing in position, the direction of lateral movement of the trolleys "Up" or "Down" is defined by the polarity of the supply to the motor $h1$. This selection is effected by the contacts $r11b$, $r12b$, of the relays $r11$ and $r12$, which are in turn energized by the limit switches $r13$ and $r14$, actuated by the adjustable stops $r15$ and $r16$. When the stop $r15$ is at its top position for example, the contact $r13a$ closes and excites the relay $r11$ which in its turn sends through its contact $r11b$ the polarity to the motor $h1$ for downward movement.

This downward movement begins and continues by the holding of the relay $r11$ caused by the circuit passing through the self-supply contact $r11a$ and the closed contact r14b; the change-over switch r9 re-closes this circuit. The holding of the relay r11 continues until the stop r16 reaches the bottom point, at which it then opens the contact r14b, thus stopping the downward movement. This stop closes a moment after the contact r14a which in its turn excites the relay r12 and the same cycle is recommenced in the reverse order.

Advantage is taken of the coincidence of the non-excitation of the two relays r11 and r12 to move the working line by the motor m9 which is supplied through the contacts r11c, r12c, r2, r4. The change-over switches r8 and r9 may also be changed over to manual for this operation.

In any case, the interlocking prevents the automatic movement upwards or downwards of the trolleys while the motor m9 is rotating, or it prevents this motor from rotating if one of the two relays r11 or r12 for the movement of the trolleys is excited.

In addition, the coupling unit p6 co-ordinates the successive welding cycles and the pressures on the welding equipments e1 and e2 by the electro-valves r17 and r18. The switches r19 and r20 select the "Manual" or "Automatic" position, and the push-buttons r21 and r22 permit pressures of any desired duration to be applied during manual operation (after-welding for example). This unit also controls the electro-valves r25 and r26 of the pressure jacks n through the switches r23 and r24. A safety circuit passing through the contacts r11d, r12d, r3a, r23, r24 only puts the coupling unit under voltage when the switch r27 is closed; an indicator r28 shows when this voltage has been applied.

It will readily be understood that the multiple combinations rendered possible by the various circuits, both manual and automatic, cannot be detailed here, all these combinations being obvious and standard practice for those skilled in the art.

The assembly of the unit to be welded, together with the mounting which holds it in position, as described above, have only been given purely by way of example and without any limitative sense. It must be understood that modifications of detail may be made to the welding machine described above without thereby departing from the scope of the invention.

We claim:

1. In a welding machine of the type having two opposite trolleys carrying the welding equipment and guiding means therefor and moving simultaneously in order to effect straight lines of welding, while applying variable and opposite pressures, the axes of the said straight lines of welding being located in line with each other:
   (a) a rectangular, elongated frame constituted by two half-frames, each of which is in the shape of a U, in which the bar of each of the said half-frames forms one of the large sides of the said frame, and the two branches of the said half-frames forms the small sides of the said frame when they are coupled together by the means of a first rotating axis on one of said small sides and by an opening joint on the other of said sides;
   (b) a pivotal shaft means supported by a base fixed to the ground, and about which on a second rotating axis a blocked half-frame can pivot;
   (c) means for locking said half-frame in any position between a vertical position and a position close to the horizontal;
   (d) a pivotal means for the opening of the said frame, around said first rotating axis, this means being supported by the two arms constituting one of the said small sides of the frame, and this pivoted means being parallel to the said pivotal shaft means about which the non-blocked half-frame can pivot with respect to said blocked half-frame.
   (e) two lead-screw means respectively parallel to each of the said large sides of the said frame, by which the said trolleys which carry the welding equipment, are driven along guiding means.
   (f) a variable speed driving device by which the two said lead-screw means are rotated;
   (g) supporting means for holding the parts of the assembly to be welded in position with respect to the frame;
   (h) mounting means by which all the elements of the assembly are maintained in position with respect to each other during the passage of the said assembly from a position corresponding to an effective welding operation to the adjacent position corresponding to the following effective welding operation; comprising an upper ring and lower ring, mandrels between said upper and lower ring, and motor acting said rings on a bearing for moving the assembly between the position corresponding to an effective welding operation to the adjacent position corresponding to the following effective welding operation;
   (i) an electrical and pneumatic equipment by which the said lead-screw means, the said supporting and mounting means for the assembly are operated in synchronism together with the operations of the two said trolleys, moving parallel to the large sides of the said frame under the action of their respective said lead-screw means and symmetrically with each other with respect to a fixed line of work defined by the intersection of the common axis of the said guiding means carried by the two said trolleys and the plane perpendicular to the said frame and passing through the centre of its small sides.

2. A welding machine as claimed in claim 1, in which the said means for locking one of the said half-sides of the frame in any position between a vertical position and a position close to the horizontal, consists of a rigid support articulated at one of its extremities in the vicinity of the extremity of the large side of the said half-frame, the other extremity of the said support being able to occupy different positions with respect to the ground.

3. A welding machine as claimed in claim 1 in which each of the two said trolleys carrying the welding equipment, is guided on two vertical shafts respectively fixed to the corresponding half-frame, longitudinally with said large sides, and the movement of the said trolley is produced by the rotation of one of the said lead-screw means, the said shaft and the said lead-screw means being parallel to each other.

4. A welding machine as claimed in claim 1 in which the control means of the said variable speed driving device comprises a variable speed electric motor, a toothed wheel driven by the shaft of the said motor through the intermediary of a first endless screw and keyed on a shaft carrying two toothed wheels each actuated by a magnetic coupling, two further endless screws, each of which is engaged with a toothed wheel keyed on one of the two said lead-screws and each of them, through the instrumentality of the two latter endless screws, being capable of engagement with one of the magnetically-coupled wheels, the shaft of the endless screw which actuates the lead-screw corresponding to the half-frame being able to pivot about the said pivotal means, coincident with this latter, so that this lead-screw returns to its initial position with respect to its endless screw after the frame has been opened and closed.

5. A welding machine as claimed in claim 1, in which the said supporting means for holding the parts of the assembly to be welded in position with respect to the said frame are constituted by a variable number of identical devices grouped together in pairs, each device comprising a rubber strip applied on a rigid strip, arms at one extremity of which are mounted the said rigid strips with a certain degree of freedom, the said arms being furthermore articulated about an axis parallel to the large sides of the frame, through the intermediary of bearings carried by levers fixed to one half-frame, and a pneumatic jack also rigidly fixed to the half-frame, the rod of which causes the whole of the said device to rotate about its axis parallel to the large sides of the frame when moved, the said device being conjugated with a further identical device fixed to the other half-frame so that the element of one assembly can be fixed with respect to the frame between the two strips of rubber of the two devices.

6. A welding machine as claimed in claim 1, in which the said mounting means for holding the elements of the assembly in position with respect to each other between two successive welding operations on two adjacent lines of working comprises two rings of different diameters resting on guiding rollers carried by a plurality of supports fixed with respect to the ground, between which are arranged the panels of the assembly, lower ring carrying pins engaging in hollow corrugations formed in each panel, the upper ring serving as an abutment for mandrels introduced into said adjacent corrugations of the lines of welding to be effected, the spacing of the said mandrels being maintained by nipples and clamping collars distributed at a distance from each other and locking the portion passing beyond certain mandrels on the said upper ring; and an electric motor directly driving the lower ring, the inner face of which is toothed for that purpose.

7. In a welding machine of the type having two opposite trolleys carrying the welding equipment and guiding means therefor and moving simultaneously in order to effect straight lines of welding while applying variable and opposite pressures, the axes of the said straight lines of welding being located in line with each other:

(a) a rectangular, elongated frame constituted by two half-frames, each of which is in the shape of a U, in which the bar of each of the said half-frames forms one of the large sides of the said frame, and the two branches of the said half-frames form the small sides of the said frame, when they are coupled together by means of a first rotating axis on one of said small sides and by an opening joint on the other of said sides;

(b) a pivotal shaft means supported by a base fixed to the ground, and about which on a second rotating axis a blocked half-frame can pivot;

(c) means for locking said blocked half-frame in any position between a vertical position and a position close to the horizontal;

(d) a pivotal means for the opening of the said frame around said first rotating axis, this pivotal means being supported by the two arms constituting one of the said small sides of the frame, and this pivotal means being parallel to the said pivotal shaft means about which the non-blocked half-frame can pivot with respect to the blocked half-frame;

(e) two lead-screw means respectively parallel to each of the said large sides of the said frame, by which the said trolleys which carry the welding equipment, are driven along by guiding means;

(f) a variable speed driving device by which the two said lead-screw means are rotated;

(g) supporting means for holding the parts of the assembly to be welded in position with respect to the frame;

(h) mounting means by which all the elements of the assembly are maintained in position with respect to each other during the passage of the said assembly from a position corresponding to an effective welding operation to the adjacent position corresponding to the following effective welding operation;

(i) an electrical and pneumatic equipment by which the said lead-screw means, the said supporting and mounting means for the assembly are operated in synchronism together with the operations of the two said trolleys, the said equipment comprising supply bars and a voltage supply network connected to each other, an electric circuit coupled to said voltage supply network producing the welding current and bringing it to said supply bars when the mounting means supporting the assembly is fixed with respect to the frame, a circuit for controlling the motor between two successive welding operations along two adjacent lines of working, so as to rotate the mounting means, a circuit for controlling the upward and downward movements of the trolleys, together with electro-valves for the jacks of the trolleys carrying the welding equipment, and electro-valves for the jacks of the holding means for the elements of the assembly with respect to the frame, an interlock automatically preventing the upward or downward movements of the trolleys while the motor is rotating and preventing the operation of the said motor while the said circuit controlling the upward and downward movement of the trolleys and controlling the electro-valves of the jacks is excited.

8. A welding machine as claimed in claim 7 in which the said electric circuit producing the welding current comprises a generator-dephaser of synchronised impulses, a generator of square top waves, a mixing unit, a control unit and a transformer having its output connected to the current supply bars.

References Cited
UNITED STATES PATENTS

| | | | |
|---|---|---|---|
| 1,947,300 | 2/1934 | Mayoh | 219—126 |
| 2,191,476 | 2/1940 | Hopkins | 219—125 |
| 2,743,692 | 5/1956 | Wietzel et al. | 219—125 X |
| 3,275,794 | 9/1966 | Du Busker et al. | 219—161 X |

RICHARD M. WOOD, *Primary Examiner.*

B. A. STEIN, *Assistant Examiner.*